Aug. 11, 1953  G. DUYCK  2,648,124
METHOD OF MANUFACTURING ELECTROMAGNETS
Filed Aug. 6, 1948  3 Sheets-Sheet 1
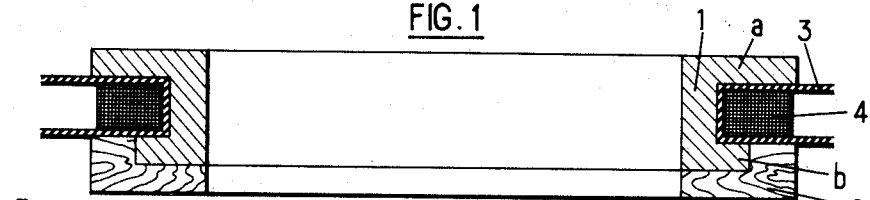
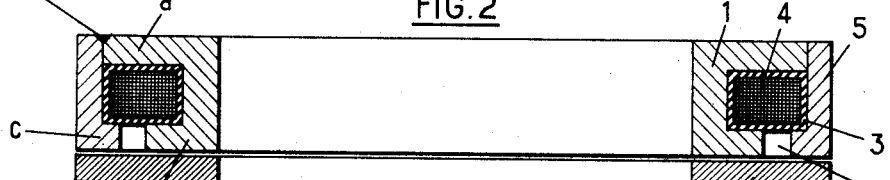
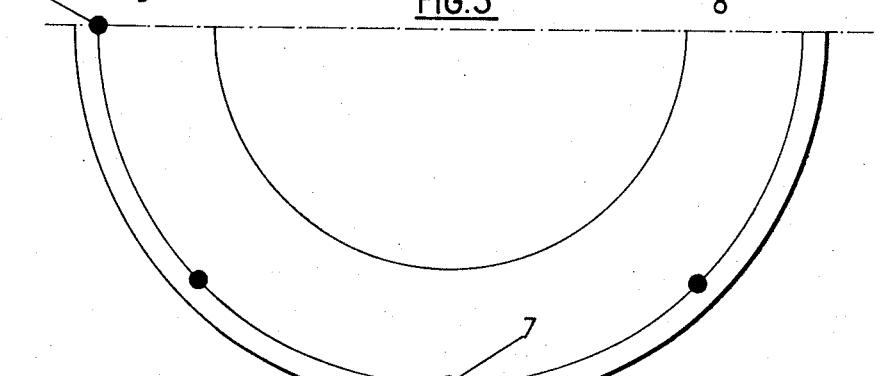
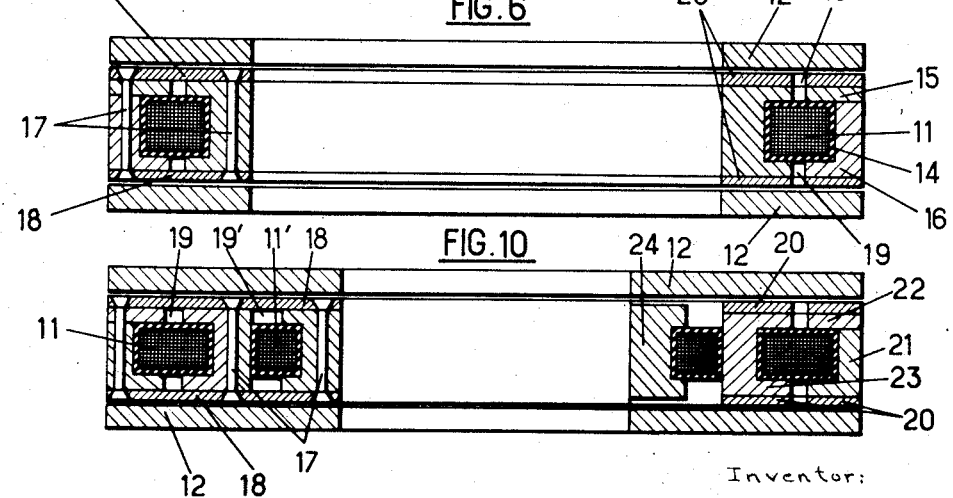
Inventor:
Georges Duyck
By Wenderoth, Lind & Ponack
Attorneys Aug. 11, 1953  G. DUYCK  2,648,124
METHOD OF MANUFACTURING ELECTROMAGNETS
Filed Aug. 6, 1948  3 Sheets-Sheet 2
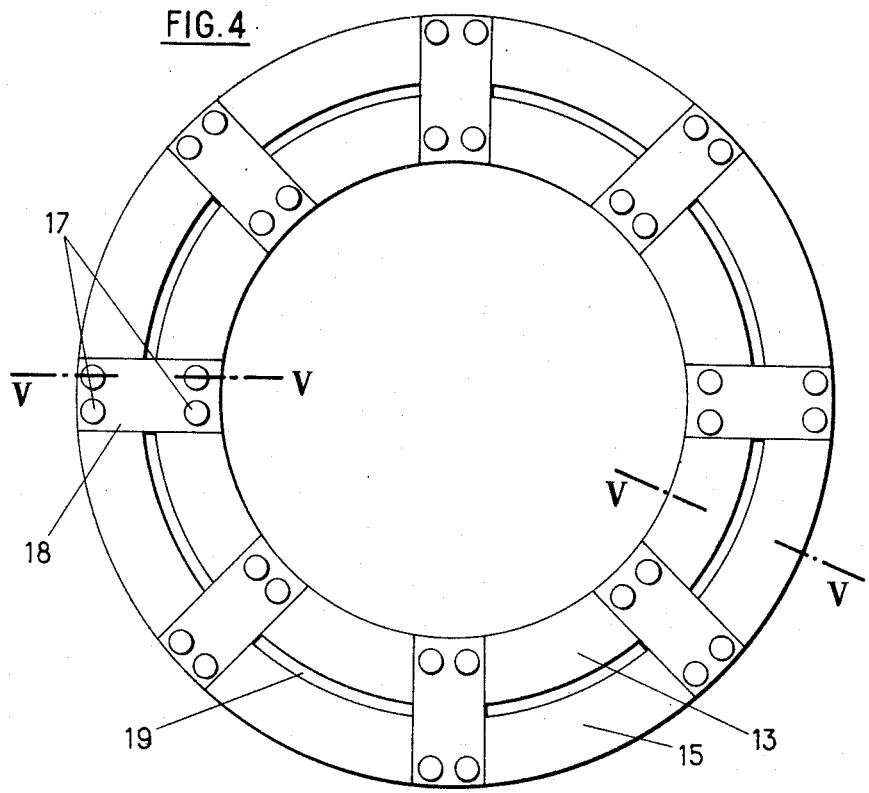
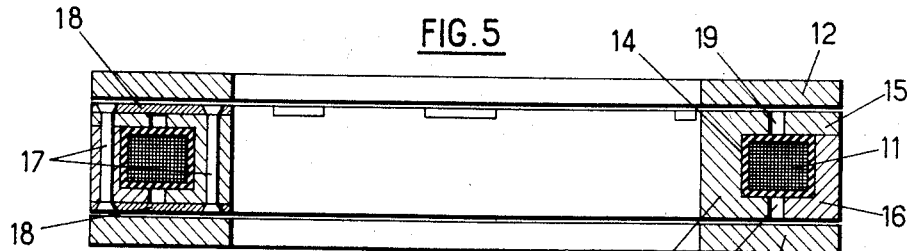
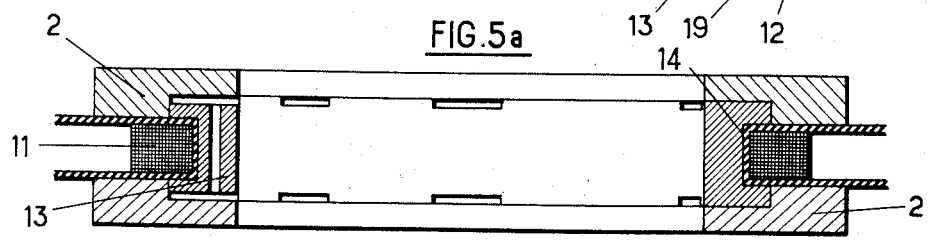
Inventor:
Georges Duyck
By Wenderoth, Lind & Ponack
Attorneys Aug. 11, 1953  G. DUYCK  2,648,124
METHOD OF MANUFACTURING ELECTROMAGNETS
Filed Aug. 6, 1948  3 Sheets-Sheet 3
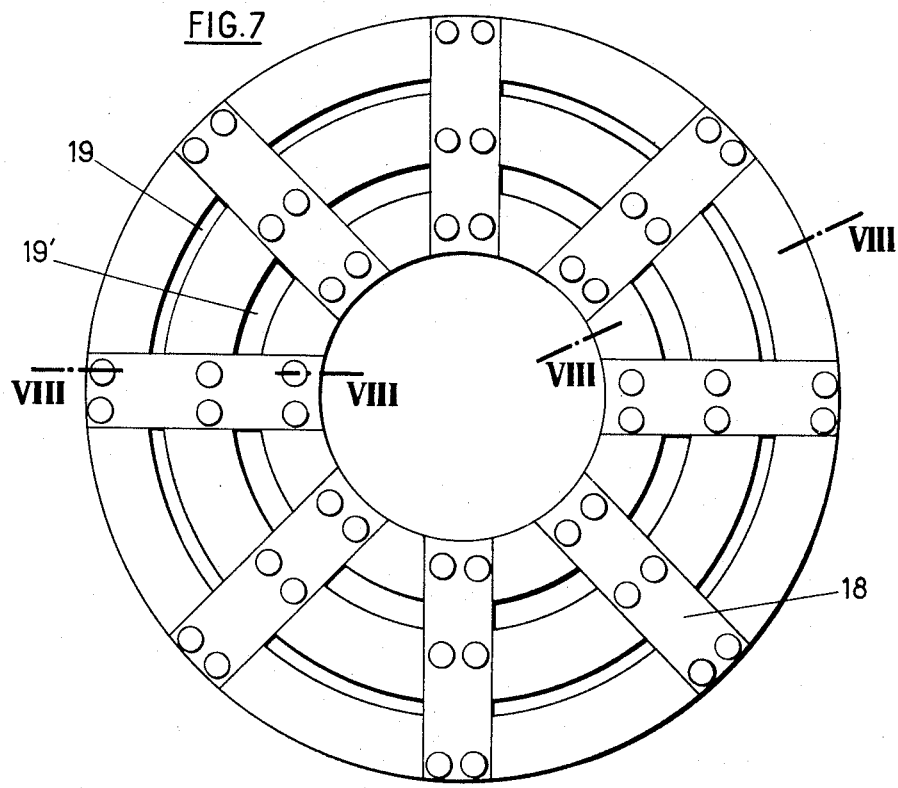
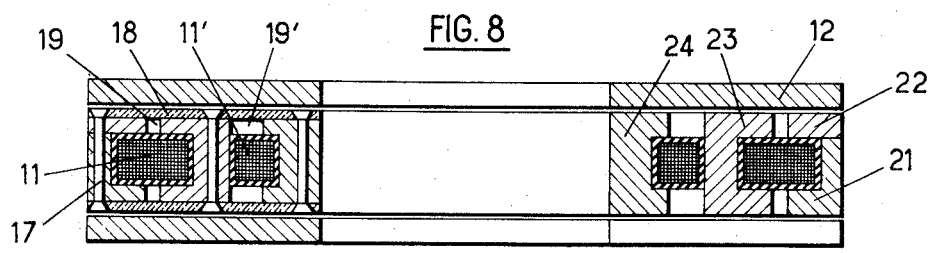
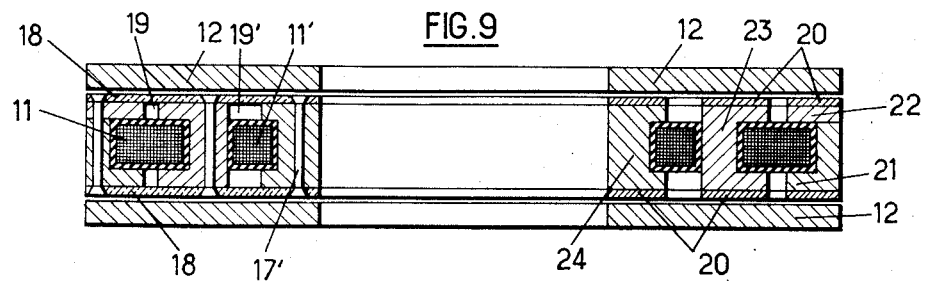
Inventor:
Georges Duyck
By Wenderoth, Lind & Ponack
Attorneys

UNITED STATES PATENT OFFICE 2,648,124

METHOD OF MANUFACTURING ELECTROMAGNETS

Georges Duyck, Tangier, Morocco

Application August 6, 1948, Serial No. 42,971
In France August 9, 1947

1 Claim. (Cl. 29—155.57)

The invention relates to an improved method of manufacturing electromagnets.

It is an object of the invention to produce electromagnets of generally annular form wherein radial flanges are provided in the inner magnetic housing element to form outwardly directed annular grooves for the winding of the electromagnet, the winding being formed in a provisional auxiliary means radially extending from the flanges, said provisional auxiliary means being removed after winding, instead of having to utilize an auxiliary jig or core as has heretofore been necessary in conventional practice.

A further object of the invention is a method of providing an electromagnet in which a removable provisional auxiliary means extending from the flanges in the inner magnetic housing of the electromagnet is used for winding the electromagnet in an outwardly directed annular groove, of itself, insufficient in radius to permit the winding to be directly formed thereon, wherein the outer housing element of the electromagnet is spaced from the inwardly radial flanges by lateral radial spacers.

Other objects, features and advantages of the invention will appear from the ensuing disclosure made in reference with the accompanying drawings wherein:

Fig. 1 is a diametric cross-sectional view of an improved electromagnet in the course of winding according to the method of the invention, in a first form of embodiment thereof;

Fig. 2 is a similar cross-sectional view showing the winding completed and the electromagnet in mounted condition;

Fig. 3 is half a plan view of the same electromagnet;

Fig. 4 is a front view of an electromagnet including a single winding and two armatures according to an embodiment of the invention, one of the armatures being removed;

Fig. 5 is a cross-section along line V—V of Fig. 4;

Fig. 5a shows in cross-section the electromagnet of Fig. 5 in the course of winding according to the method of the invention.

Fig. 6 is a cross-section similar to Fig. 5 of a modification which differs from the embodiment illustrated in Figs. 4 and 5, in the character of the frictional surfaces used;

Fig. 7 is a front view of a dual-winding electromagnet comprising another modification of the invention including two armatures, one armature being removed;

Fig. 8 is a cross-section along line VIII—VIII of Fig. 7;

Fig. 9 is a cross-section similar to Fig. 8 illustrating a modification of the invention which differs from that shown in Figs. 7 and 8 in the character of the frictional surfaces used, and Fig. 10 is a similar cross-section illustrating a modification in which one of the electromagnets functions as an actuating magnet.

In these forms the magnetic housing or carcass for the field winding is formed of two elements, an inner and an outer element.

In the first form of embodiment shown in Fig. 1 the winding is arranged in a groove of the inner element 1. Said inner element comprises an annular part formed with end flanges $a$ and $b$ of unequal radial length, as shown, defining therebetween the groove which is to contain the winding.

In order that the winding may be directly formed in said groove, the shorter one $b$ of the above-mentioned flanges is temporarily extended through the use of a provisional auxiliary flange member 2 made of any suitable material such as wood, and of any convenient shape; in this way there is formed a groove defined by flanges of equal length.

Prior to forming the winding, said groove is lined with insulating sheet material, preferably somewhat plastic in character, such as paper, bakelized cardboard, asbestos board, linen or cotton fabric, or the like, then the winding is formed in the usual way until an outer diameter is reached slightly less than the outer diameter of the flanges. A side edge of the insulating sheet material 3 is folded over to enclose the completed winding 4 after the ends thereof have been led out.

The provisional flange 2 is then removed and the annular ring or external housing element 5 is mounted in place (see Fig. 2), said outer element 5 being mounted in centered relation with and a tight fit around the flange $a$ of the inner element 1. The ring 5 is formed with an enlarged section $c$ defining a shoulder adapted to limit the amount of penetration of the ring 5 and which is so dimensioned as to define between it and the flange $b$ an air gap 6 of sufficient size practically to prevent closure of the magnetic circuit therethrough.

The mutually engaging surfaces of the elements 1 and 5 are very carefully machined so as to minimize any slight air gap which might tend to form therebetween. Any suitable means may be used to connect the elements 1 and 5 rigidly together, for instance electric spot-welding at a few spaced points, as shown at 7 in Figs. 2 and 3.

The magnetic circuit is completed in the usual manner through an armature 8 of magnetic steel.

In a modification of the invention, the insulating means described above are replaced by an insulating procedure which consists of coating the surfaces of the magnetic housing which are to be engaged by the winding structure, with a coating composition comprising an electrically insulating material with a suitable adhesive admixed therewith, so as to be capable of application to said surfaces through any suitable means similar to those used in the application of paint for instance, such as with a brush, a spray gun or the like.

In such case, and in order to increase the plasticity of the insulating coating composition, it is found desirable to add thereto suitable solid fibrous filler constituents, such as cotton fibre, glass wool, asbestos fibre, insulating powder materials or the like. An advantage of this procedure is to provide a coating of such composition and consistency as to aid in retaining the winding in position.

In the last-mentioned modification, it may further be desirable to place a perforate paper strip element at the level of the inter-polar gap, thus further improving the insulation of the system.

Windings formed according to the invention may or may not be impregnated by any suitable known method, with an appropriate liquid insulating composition such as a suitable synthetic resin, for instance the material generally known as Bakelite.

The contacting surfaces of the electromagnet or the armature, or both, may be lined with elements of graphitized sintered steel similar to those which will be described presently, and the purpose of which is to reduce friction between each electromagnet and the related armature, and thus to render, in operation, the positive engagement of both those members more smooth and gradual.

Now referring to the embodiment shown in Figs. 4, 5 and 5a, the electromagnet shown comprises, on the one hand, an electromagnet proper, essentially formed of a winding 11 adapted to have an electric current flow therethrough and partially surrounded with a metallic housing or carcass conductive for the magnetic field, and, on the other hand, a pair of armatures 12, 12, through which the magnetic circuit is adapted to be completed.

Said magnetic housing or carcass of the electromagnet is formed of a plurality of ring elements surrounding the winding. The innermost ring element 13 defines a groove in which the bottom and side walls of a channel shaped insulating protective covering 14 are coiled. The winding is accomplished as shown in Fig. 5a with the temporary use of auxiliary flanges 2 as described in connection with Figs. 1 and 2. The outer ring element of the electromagnet comprises a pair of parts 15—16. Finally, the electromagnet is assembled by means of rivets 17 and spacer elements 18 of non-magnetic material. Two annular air gaps 19 are provided having similar characteristics as the air gap 6 of Fig. 2.

The modification shown in Fig. 6 only differs from the embodiment just described in the use, for the formation of the friction surfaces, of strip elements 20 of sintered and/or graphitized steel adapted to reduce the friction between the electromagnet and the armatures thereof, whereby the engagement of the members in operation is caused to become smooth and gradual, and impacts are eliminated. The strips 20 (see Fig. 6) are in the form of annular sectors and are fitted between the spacer elements 18.

In the embodiments of Figs. 7 to 10 inclusive, the general organization of the electromagnet is similar to the previously described embodiments, and may comprise frictional surfaces involving steel-against-steel as in Fig. 8 or steel-against-sintered graphitized steel as in Figs. 9 and 10. However, the electromagnets shown in those figures differ from those shown in Figs. 4 to 6 in that they include two concentrically arranged windings 11 and 11', the magnetic housing accordingly including three rings, namely, an outer ring in two parts 21 and 22, an intermediate ring 23 and an innermost ring 24, said rings defining therebetween, a pair of concentrical annular air gaps 19 and 19', so predetermined as practically to prevent closure of the magnetic circuit without passing through the armatures.

With such an arrangement including concentrical windings, the over-all useful surface of the electromagnet is increased without appreciably increasing the masses of steel involved. Moreover, comparatively short magnetic circuits are thus obtainable.

This concentric winding arrangement further makes it possible to obtain the specific type of operation described in applicant's French Patent No. 936,594, delivered February 23, 1948, describing a clutch comprising two electromagnets one of which provides for actuation of and the other for driving the armatures, the actuating electromagnet being deenergized upon engagement of the clutch.

Fig. 10 illustrates an embodiment of an electromagnet of such improved construction. The above-mentioned actuating electromagnet is the magnet 11', while the drive electromagnet constitutes the magnet 11. In the example shown, frictional engagement between the surfaces corresponding with the drive electromagnet (rings 22, 23 and armatures 22, 22) occurs through interposed strips 20 of sintered graphitized steel, as previously described in connection with Fig. 6.

I claim:

A method of producing an electromagnet of annular form with an inner magnetic housing element formed with a pair of radial flanges of equal length, which flanges define therebetween an outwardly directed annular groove for a winding, said groove being of insufficient radial extent to allow said winding to be directly formed therein, comprising applying an insulating layer in said groove, applying provisional auxiliary means to radially extend said flanges, forming a winding directly in the extended groove thus formed by said inner housing element and auxiliary means, removing said auxiliary means, mounting around the outer peripheral position of said winding a concentric outer housing element formed with an inner groove for the formed winding and with inwardly extending radial flanges spaced from said first mentioned pair of flanges to provide annular air gaps on the lateral sides of said winding and interconnecting together said inner housing element and said outer housing element by the interposition of lateral radially extending spacer means.

GEORGES DUYCK.

References Cited in the file of this patent

UNITED STATES PATENTS

| Number | Name | Date |
|---|---|---|
| 792,076 | Read | June 13, 1905 |
| 799,156 | Goldberg | Sept. 12, 1905 |
| 1,120,375 | Cutler | Dec. 8, 1914 |
| 1,485,289 | Peterson | Feb. 26, 1924 |
| 1,775,981 | Warner | Sept. 16, 1930 |
| 1,823,334 | Payne | Sept. 15, 1931 |
| 1,902,491 | Dahl | Mar. 21, 1933 |
| 1,956,826 | Engholm | May 1, 1934 |
| 1,944,870 | Apple | Jan. 30, 1934 |
| 2,148,393 | Bowman-Manifold | Feb. 21, 1939 |
| 2,213,093 | Reese | Aug. 27, 1940 |
| 2,224,254 | Cotal | Dec. 10, 1940 |
| 2,285,233 | Smith | June 2, 1942 |
| 2,388,598 | Cahill | Nov. 6, 1945 |
| 2,462,393 | Haynes | Feb. 22, 1949 |